United States Patent [19]

Stuetz

[11] Patent Number: 4,460,708

[45] Date of Patent: Jul. 17, 1984

[54] PRODUCTION OF ACTIVATED CARBON FIBERS FROM ACID CONTACTED POLYBENZIMIDAZOLE FIBROUS MATERIAL

[75] Inventor: Dagobert E. Stuetz, Watchung, N.J.

[73] Assignee: Celanese Corporation, New York, N.Y.

[21] Appl. No.: 492,290

[22] Filed: May 6, 1983

[51] Int. Cl.$^3$ .................. C01B 31/12; C01B 31/10; D01F 9/12

[52] U.S. Cl. .................. 502/426; 264/29.2; 423/447.4; 502/425; 502/434

[58] Field of Search .............. 252/422, 423, 444, 445; 423/447.1, 447.2, 447.6, 447.4; 264/29.2; 502/426, 433, 434, 436, 437, 425

[56] References Cited

U.S. PATENT DOCUMENTS 3,903,248 9/1975 Kalnin et al. ............... 423/447.6
4,073,869 2/1978 Kalnin ....................... 423/447.1
4,401,588 8/1983 Turner ........................ 252/421

Primary Examiner—P. E. Konopka
Attorney, Agent, or Firm—Burns, Doane, Swecker & Mathis

[57] ABSTRACT

An improved process which makes possible the expeditious formation of activated carbon fibers having high absorptivity characteristics is provided. A polybenzimidazole fibrous material is contacted with a solution of an acid (e.g. sulfuric acid) so as to form a polybenzimidazonium salt (as described), and the resulting fibrous material is preoxidized, carbonized, and activated under the conditions defined which have been found to reliably and expeditiously yield the desired product. The resulting activated carbon fiber product exhibits a dynamic weight absorptivity of at least 100 mg. of $CCl_4$ per gram, and particularly is suited for the formation of protective garments having highly satisfactory sorptive characteristics.

22 Claims, No Drawings

PRODUCTION OF ACTIVATED CARBON FIBERS FROM ACID CONTACTED POLYBENZIMIDAZOLE FIBROUS MATERIAL

BACKGROUND OF THE INVENTION

Activated carbon fibers have been reported in the prior art and are recognized articles of commerce. For instance, such activated carbon fibers have been formed in the past beginning with either acrylic or cellulosic (i.e. Rayon) fibrous precursor materials. Such processes of the prior art have tended to be unduly time consuming and to require precise tension control during certain of the processing steps. Accordingly, the prior art processes have tended to be complex and to be relatively expensive to operate. Representative prior processes for forming activated carbon fibers are disclosed in U.S. Pat. Nos. 4,234,326; 4,256,607; 4,285,831; 4,362,646; and 4,366,085; and in British Pat. No. 1,553,357.

It further has heretofore been reported in the prior art that carbon fibers may be formed beginning with a polybenzimidazole fibrous material. Representative prior processes for forming carbon fibers are disclosed in U.S. Pat. Nos. 3,449,077; 3,495,940; 3,528,774; 3,634,035; 3,635,675; 3,903,248; U.S. Defensive Publication No. T100,303; and British Pat. No. 1,295,289. None of these disclosures concern the formation of activated carbon fibers having unusually high absorptivity characteristics such as those formed through the use of the present process.

It is an object of the present invention to provide a process for the expeditious formation of activated carbon fibers, which optionally may be used to form fabrics, etc.

It is an object of the present invention to provide an improved process for the formation of activated carbon fibers having high absorptivity characteristics.

It is an object of the present invention to provide an improved process for formation of activated carbon fibers in which the activation step satisfactorily may be carried out at a relatively low temperature of approximately 450° to 600° C.

It is an object of the present invention to provide an improved process for the formation of activated carbon fibers wherein good weight retention is observed following the conversion of the fibrous precursor to the activated carbon fibrous product.

It is an object of the present invention to provide an improved process for the formation of activated carbon fibers which particularly are suited for use in the construction of lightweight protective clothing, etc.

It is a further object of the present invention to provide activated carbon fibers derived from a polybenzimidazole fibrous precursor which exhibit a dynamic weight absorptivity of at least 100 mg. of $CCl_4$ per gram, and preferably at least 125 mg. of $CCl_4$ per gram.

These and other objects as well as the scope, nature, and utilization of the claimed invention will be apparent to those of ordinary skill in the art from the following detailed description and appended claims.

SUMMARY OF THE INVENTION

An improved process is provided for forming activated carbon fibers comprising:

(a) contacting polybenzimidazole fibrous material with a solution of an acid having a $pK_A$ value below about 4.5 to transform at least a portion of the polybenzimidazole to a polybenzimidazonium salt wherein the anion of the salt is derived from the acid, (b) preoxidizing the polybenzimidazole fibrous material containing the polybenzimidazonium salt by heating in an oxygen-containing gaseous atmosphere at a temperature of approximately 400° to 550° C., (c) carbonizing the resulting preoxidized fibrous material by heating in a non-oxidizing gaseous atmosphere at a temperature of approximately 650° to 875° C. until a carbonaceous fibrous material is formed which contains at least 60 percent carbon by weight, and (d) heating the resulting carbonaceous fibrous material in an oxidizing gas at a temperature of approximately 450° to 600° C. until an activated carbonaceous fibrous material is formed having a dynamic weight absorptivity of at least 100 mg. of $CCl_4$ per gram.

DESCRIPTION OF PREFERRED EMBODIMENT

The Starting Material

A fibrous polybenzimidazole starting material is selected for use in the process of the present invention. The starting material may be provided in any one of a variety of physical configurations when carrying out the process of the present invention and preferably exhibits a denier per filament of approximately 1 to 4. For instance, such fibrous material conveniently can be provided as a continuous multifilamentary or staple yarn. The polybenzimidazole fibrous material optionally may be provided in a fabric in woven or knitted form or as a felt, etc.

Polybenzimidazoles are a known class of heterocyclicpolymers. Typical polymers of this class and their preparation are more fully described in U.S. Pat. No. 2,895,948, U.S. Pat. No. Re. 26,065, and in the Journal of Polymer Science, Vol. 50, pages 511–539 (1961) which are herein incorporated by reference. The polybenzimidazoles consist essentially of recurring units of the following Formulas I and II. Formula I is:

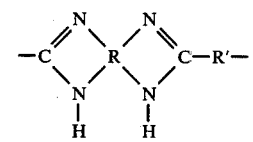

wherein R is a tetravalent aromatic nucleus, preferably symmetrically substituted, with the nitrogen atoms forming the benzimidazole rings being paired upon adjacent carbon atoms, i.e. ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

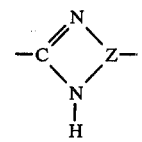

wherein Z is an aromatic nucleus having the nitrogen atoms forming the benzimidazole ring paired upon adjacent carbon atoms of the aromatic nucleus.

Preferably, aromatic polybenzimidazoles are selected, e.g. polymers consisting essentially of the recurring units of Formulas I and II wherein R' is at least one aromatic ring or a heterocyclic ring.

As set forth in U.S. Pat. No. Re. 26,065, the aromatic polybenzimidazoles having the recurring units of Formula II may be prepared by self-condensing a trifunctional aromatic compound containing only a single set of ortho disposed diamino substituents and an aromatic preferably phenyl, carboxylate ester substituent. Exemplary of polymers of this type is poly-2,5(6)-benzimidazole prepared by the autocondensation of phenyl-3,4-diaminobenzoate.

As also set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon a carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:
poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexeneyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'(m-phenylene)-5,5'-di(benzimidazole) sulfone;
poly-2,2'-(m-phenylene)-5,5'-di(benzimidazole) methane;
poly-2',2"-(m-phenylene)-5',5"-di(benzimidazole)-propane-2,2; and
poly-2',2"-(m-phenylene)-5',5"-di(benzimidazole)ethylene-1,2,
where the double bonds of the ethylene groups are intact in the final polymer.

The preferred polybenzimidazole for use in the present process is one prepared from poly-2,2'-(m-phenylene)-5,5'-bibenzimidazole, the recurring unit of which is:

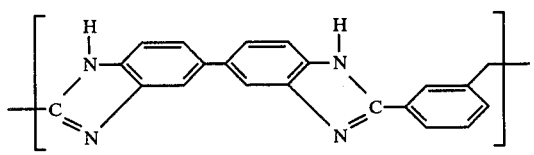

Any polymerization process known to those skilled in the art may be employed to prepare the polybenzimidazole which may then be formed into a continuous length of fibrous material. Representative techniques for preparing the polybenzimidazole are disclosed in U.S. Pat. Nos. 3,509,108; 3,549,603; and 3,551,398, which are assigned to the assignee of the present invention and are herein incorporated by reference.

With respect to aromatic polybenzimidazoles, preferably equimolar quantities of the monomeric tetraamine and dicarboxyl compound are introduced into a first stage melt polymerization reaction zone and heated therein at a temperature above about 200° C., preferably at least 250° C., and more preferably from about 270° to 300° C. The reaction is conducted in a substantially oxygen-free atmosphere, i.e. below about 20 ppm oxygen and preferably below about 8 ppm oxygen, until a foamed prepolymer is formed having an inherent viscosity, expressed as deciliters per gram, of at least 0.1 and preferably from about 0.13 to 0.3, the inherent viscosity (I.V.) as used herein being determined from a solution of 0.4 grams of the polymer in 100 ml. of 97 percent $H_2SO_4$ at 25° C.

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.6, e.g. 0.80 to 1.1 or more.

The temperature employed in the second stage is at least 250° C., preferably at least 325° C., and more preferably from about 350° to 425° C. The second stage reaction generally takes at least 0.5 hour, and preferably from about 1 to 4 hours or more.

A particularly preferred method of preparing the polybenzimidazole is disclosed in the aforesaid U.S. Pat. No. 3,509,108. As disclosed therein aromatic polybenzimidazoles may be prepared by initially reacting the monomer in a melt phase polymerization at a temperature above about 200° C. and a pressure above 50 psi (e.g. 300 to 600 psi) and then heating the resulting reaction product in a solid state polymerization at a temperature above about 300° C. (e.g. 350° to 500° C.) to yield the final product.

As is known in the art, polybenzimidazoles are generally formed into continuous lengths of fibrous materials by solution spinning, that is, by dry or wet spinning a solution of the polymer in an appropriate solvent such as N,N-dimethylacetamide, N,N-dimethylformamide, dimethylsulfoxide or sulfuric acid (used only in wet spinning) through an opening of predetermined shape into an evaporative atmosphere for the solvent in which most of the solvent is evaporated (dry) or into a coagulation bath (wet), resulting in the polymer having the desired filamentary shape.

The polymer solutions may be prepared in accordance with known procedures. For example, sufficient polybenzimidazole may be dissolved in the solvent to yield a final solution suitable for extrusion containing from about 10 to 45 percent by weight of the polymer, based on the total weight of the solution, preferably from about 20 to 30 percent by weight.

One suitable means for dissolving the polymer in the solvent is by mixing the materials at a temperature above the atmospheric boiling point of the solvent, for example 25° to 120° C. above such boiling point and at a pressure of 2 to 15 atmospheres for a period of 1 to 5 hours.

Preferably, the polymer solutions, after suitable filtration to remove any undissolved portions, are dry spun.

For example, the solutions may be extruded through a spinneret into a conventional type downdraft spinning column containing a circulating inert gas such as nitrogen, noble gasses, combustion gasses, or super-heated steam. Conveniently, the spinneret face is at a temperature of from about 100° to 170° C., the top of the column from about 120° to 220° C., the middle of the column from about 140° to 250° C., and the bottom of the column from about 160° to 320° C. After leaving the spinning column, the continuous filamentary materials are taken up, for example, at a speed within the range of about 50 to 350 meters or more per minute. If the continuous filamentary materials are to be washed while wound on bobbins, the resulting "as-spun" materials may be subjected to a slight steam drawing treatment at a draw ratio of from about 1.05:1 to 1.5:1 in order to prevent the fibers from relaxing and falling off the bobbin during the subsequent washing step. Further details with respect to a method for dry-spinning a continuous length of a polybenzimidazole fibrous material are shown in U.S. Pat. No. 3,502,756 to Bohrer et al which is assigned to the same assignee as the present invention and is herein incorporated by reference.

The continuous length of polybenzimidazole fibrous material is next washed so as to remove at least the major portion of residual spinning solvent, e.g. so that the washed materials contain less than about 1 percent by weight solvent based on the weight of the continuous filamentary material, and preferably so as to obtain an essentially spinning solvent-free fibrous material (i.e. a fibrous material containing less than about 0.1 percent solvent by weight). Typically, a simple water wash is employed; however, if desired, other wash materials such as acetone, methanol, methylethyl ketone and similar solvent-miscible and volatile organic solvents may be used in place of or in combination with the water. The washing operation may be conducted by collecting the polybenzimidazole fibrous material on perforated rolls or bobbins, immersing the rolls in the liquid wash bath and pressure washing the fibrous material, for example, for about 2 to 48 hours or more. Alternatively, the continuous length of polybenzimidazole fibrous material may be washed on a continuous basis by passing the fibrous material in the direction of its length through one or more liquid wash baths (e.g. for 1 to 10 minutes). Any wash technique known to those skilled in the art may be selected.

The continuous length of polybenzimidazole fibrous material may next be dried to remove the liquid wash bath by any convenient technique. For instance, the drying operation for bobbins of yarn may be conducted at a temperature of about 150° to 300° C. for about 2 to 100 hours or more. Alternatively, the continuous length of polybenzimidazole fibrous material may be dried on a continuous basis by passing the fibrous material in the direction of its length through an appropriate drying zone (e.g. an oven provided at 300° to 400° C. for 1 to 2 minutes). If drying is employed, preferably the drying temperature does not exceed about 250° C. for several hours or 400° C. for more than 1 minute, as above these limits degradation of the fiber may occur.

The polybenzimidazole fibrous material preferably next is hot drawn at a draw ratio of about 2:1 to 5:1 in order to enhance its orientation. Representative draw procedures as disclosed in commonly assigned U.S. Pat. Nos. 3,622,660, and 3,849,529. Woven or knitted fabrics of the polybenzimidazole fibrous material may be formed by standard techniques.

THE FORMATION OF A POLYBENZIMIDAZONIUM SALT

The polybenzimidazole fibrous material next is contacted with a solution of an acid having a $pK_A$ below about 4.5 (preferably below about 3.5) to transform the polybenzimidazole to a polybenzimidazonium salt wherein the anion of the salt is derived from the acid.

The acid selected may be organic or inorganic in nature and preferably is relatively non-volatile and incapable of decomposition at the treatment temperature selected. The $pK_A$ value of a given acid conveniently may be ascertained by determining the negative logarithm of the $K_A$ for acid in a 0.1M aqueous solution at 25° C. Those acids having a $pK_A$ value much above about 4.5 possess insufficient strength to be useful in the production of the desired salt. Suitable acids include the mineral acids, monobasic acid and dibasic carboxylic acids, and sulfonic acids.

Representative inorganic acids include: sulfuric acid, sulfamic acid, hydrochloric acid, phosphoric acid, perchloric acid, hydrobromic acid, hydrofluoric acid, hydriodic acid, etc.

Representative carboxylic acids include: acetic acid, oxalic acid, monochloroacetic acid, dichloroacetic acid, trichloroacetic acid, monofluoroacetic acid, difluoroacetic acid, trifluoroacetic acid, substituted benzoic acids, salicylic acid, etc.

Representative sulfonic acids include: benzene sulfonic acid, o-toluene sulfonic acid, m-toluene sulfonic acid, p-toluene sulfonic acid, 2,4-xylene sulfonic acid, toluene-2,4-disulfonic acid, 2-naphthalene sulfonic acid, bisphenol disulfonic acid, chlorosulfonic acid, methane sulfonic acid, trifluoromethane sulfonic acid, etc.

The particularly preferred acids for use in the process are sulfuric acid and sulfamic acid.

The solvent utilized to form the solution of the acid preferably is aqueous in nature; however, other solvents such as n-propanol, ethyleneglycolmonomethyl ether, methylene chloride, methanol, etc., may alternatively be employed.

The acid preferably may be provided in the solvent in a concentration of about 1 to 10 percent by weight based upon the total weight of the solution, and most preferably in a concentration of about 2 to 5 percent by weight. The acid solution preferably is provided in a quantity such that its weight exceeds that of the polybenzimidazole fibrous material undergoing treatment by about 10 to 40 times. Also the acid preferably is provided in a quantity such that at least 1 equivalent of acid (e.g. 1 to 2 equivalents of acid) reacts with each repeat unit of the polymer to form the polybenzimidazonium salt.

The solution of the acid preferably is provided at a temperature of about 20° to 80° C. (e.g. about 50° C.) when contacted with the polybenzimidazole fibrous material. It is recommended that the fibrous material be immersed in the solution of the acid in such a manner that direct contact with the solution throughout the fibrous material is maximized. For instance, a continuous length of the fibrous material may be wound on a perforated bobbin through which the acid is circulated, or it may be wound upon a frame or support to a limited thickness and positioned in the solution. Alternatively, a continuous length of the fibrous material may be continuously passed through the solution in the direction of its length while substantially suspended therein. Suitable residence times for the formation of the polybenzimidazonium salt commonly require at least about 1 second (e.g. 2 or 3 seconds) while in contact with the solution of acid. Longer residence times may be selected without commensurate advantage or when direct contact is impeded.

After the acid treatment the fibrous material preferably is washed, (i.e. rinsed) with water to remove excess free acid which is adhering to the same and is dried (e.g. at ambient conditions or in a circulating air oven). Such acid removal while not essential improves the handleability of the fibrous material and minimizes damage to equipment contacted during subsequent processing.

The formation of a polybenzimidazonium sulfate salt upon reaction of poly-2,2'-(m-phenylene)-5,5'-bibenzimidazole with sulfuric acid is illustrative of the salt formation reaction and can be represented by the following equation:

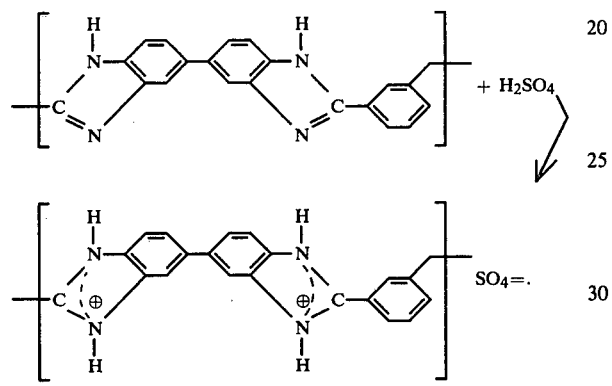

As indicated previously, it is not essential that 2 equivalents of acid react with each repeat unit of the polymer to form the polybenzimidazonium salt. Once the salt formation is conducted the fibrous material continues to exhibit its original fibrous configuration, but it exhibits substantially different properties. For instance, the tendency of the fibrous material to shrink in length when heated in an unrestrained state is substantially reduced. A similar finding was reported in Fabric Research Laboratories Report No. AFML-TR-73-29 which did not involve the production of carbon fibers or the formation of activated carbon fibers. Also, the density of the fiber is increased.

It has been found that if one attempts to omit the formation of the polybenzimidazonium salt that an unsatisfactory ultimate product will result. For instance, the resulting product becomes brittle, shrivels, etc.

THE PREOXIDATION STEP

The polybenzimidazole fibrous material containing a polybenzimidazonium salt is next heated in an oxygen-containing atmosphere at a temperature of approximately 450° to 550° C. in order to preoxidize the same and to impart stabilization to the structure thereof. The original fibrous configuration is maintained. In a preferred embodiment the oxygen-containing gaseous atmosphere is provided at a temperature of approximately 450° to 500° C. The preferred oxygen-containing gaseous atmosphere is simply air which preferably is flowing. Air satisfactorily may be provided to the preoxidation zone at a rate of approximately two pounds of air per pound of fibrous material introduced into the preoxidation zone. Typical residence times for heating in an air atmosphere commonly range from approximately 1 to 60 minutes, and preferably from approximately 5 to 10 minutes (e.g. approximately 7 minutes).

During the preoxidation step the heating may be carried out on either a static batch or continuous basis wherein the fibrous material continuously is passed through an appropriate heating zone. There is no requirement that tension be maintained upon the fibrous material during the preoxidation step or that the preoxidation treatment be carried out in a series of stages in order to obtain highly satisfactory results. For instance, a woven fabric of the fibrous material may be simply placed upon a high temperature resistant perforated support during the preoxidation step without an attempt to fix its dimensions or to maintain tension upon the fibers. Under such circumstances a length shrinkage of approximately 6 percent and an area shrinkage of approximately 12 percent for a woven fabric may be observed during the preoxidation treatment. Additionally, a weight loss of approximately 18 to 21 percent commonly is observed during the course of the preoxidation step. Off-gases from the preoxidation zone satisfactorily may be scrubbed with a solution of lime so as to deal with toxic by-products.

It has been found that if one attempts to omit the preoxidation step that an unsatisfactory ultimate product will result.

THE CARBONIZATION STEP

The resulting preoxidized fibrous material next is heated in a non-oxidizing gaseous atmosphere at a temperature of approximately 650° to 875° C. until a carbonaceous fibrous material is formed which contains at least 60 percent carbon by weight, and preferably at least 63 percent carbon by weight. During such carbonization step non-carbon components present within the fibrous material are substantially evolved and the original fibrous configuration is maintained. In a preferred embodiment the non-oxidizing gaseous atmosphere is provided at a temperature of approximately 700° to 800° C. (e.g. approximately 730° to 800° C.). The preferred non-oxidizing atmosphere is nitrogen which preferably is flowing. Nitrogen satisfactorily may be provided to the carbonization zone at a rate of approximately three pounds of nitrogen per pound of fibrous material introduced into the carbonization zone. Other representative non-oxidizing atmospheres include argon, helium, etc. Oxygen is excluded from the carbonization zone. Typical residence times for heating in the non-oxidizing atmosphere of the carbonization zone commonly range from approximately 0.5 to 5 minutes, and preferably from approximately 0.7 to 2 minutes (e.g. approximately 1 minute).

During the carbonization step the heating may be carried out on either a batch or continuous basis wherein the fibrous material continuously is passed through an appropriate heating zone. There is no requirement that tension be maintained upon the fibrous material during the carbonization step.

THE ACTIVATION STEP

The carbonized fibrous material next is heated in an oxidizing gas at the relatively low temperature of approximately 450° to 600° C. until an activated carbonaceous fibrous material is formed. During such activation step the previously carbonized fibrous material is etched so as to develop the required absorptivity characteristics. In a preferred embodiment the oxidizing gas employed in the activation step is provided at a temperature of approximately 500° to 550° C. (e.g. approximately 500° C). Representative gases for use during the activation step which are capable of oxidizing the carbonized fibrous material at the temperature involved are water vapor, carbon dioxide, nitrogen dioxide, etc. In preferred embodiments the oxidizing gas is admixed with a non-oxidizing gas such as nitrogen, argon, helium, etc. when introduced into the activation zone. In such embodiment the relative quantities of oxidizing gas and non-oxidizing gas conveniently may be selected so as to yield a 1:40 to 1:60 (e.g. 1:50) volume mixture of oxidizing gas to non-oxidizing gas. For instance, in a particularly preferred embodiment in which the oxidizing gas is water vapor nitrogen may be admixed therewith. In such embodiment nitrogen gas conveniently may be saturated with water vapor at room temperature (i.e. approximately 25° C.) and this gas mixture then elevated to the designated temperature prior to being introduced into the activation zone. Under such circumstances nitrogen and water vapor satisfactorily may be provided to the activation zone at a rate of approximately one pound of nitrogen and approximately 0.018 pound of water vapor per pound of fibrous material introduced into the activation zone. Typical residence times for heating in the oxidizing gas of the activation zone commonly range from approximately 3 to 20 minutes, and preferably from 8 to 12 minutes (e.g. approximately 10 minutes).

During the activation step the heating may be carried out on either a batch or continuous basis whereby the fibrous material continuously is passed through the appropriate heating zone. There is no requirement that tension be maintained upon the fibrous material during the activation step.

It has been found that the activated carbon fibers of the present invention commonly contain chemically bound elements introduced during the initial step of the process wherein the polybenzimidazole fibrous material is contacted with the acid solution to form a polybenzimidazonium salt. For instance, in a preferred embodiment wherein the acid employed in the initial step is sulfuric acid, the resulting activated carbon fiber will contain approximately 0.2 to 0.4 percent by weight of sulfur. A representative product may contain 64.24 percent carbon, 1.30 percent hydrogen, 16.05 percent nitrogen, 0.31 percent sulfur, and 10.75 percent oxygen, with the balance being primarily inorganic salts.

The activated carbon fibers of the present invention may be tested for their level of absorptivity by using the dynamic $CCl_4$ absorption test which is an improved version of military specification MIL-C-43858(GL). When carrying out this test, the activated carbon fibers while in the form of a circular woven fabric having a four inch diameter are subjected to a 5 liter/minute stream of air containing 5 mg. $CCl_4$/liter with the gas passing through the woven fabric. The time for breakthrough of $CCl_4$ (i.e. 35 p.p.m.) is determined and is made the basis for calculating the amount of $CCl_4$ absorbed by the sample. More specifically, the amount of $CCl_4$ in the effluent is continuously monitored by use of an I.R. detector and the sorption curve is recorded. The product of the present invention exhibits a dynamic weight absorptivity by such test of at least 100 mg. of $CCl_4$ per gram, and preferably at least 125 mg. of $CCl_4$ per gram (e.g. approximately 135 to 140 mg. of $CCl_4$ per gram). It is further found by the same test that the absorption of $CCl_4$ at breakthrough commonly is at least 1.6 mg./cm.$^2$, and preferably at least 1.8 mg./cm.$^2$ (e.g. approximately 2.0 mg./cm.$^2$).

The activated carbon fibers of the present invention also commonly exhibit a specific surface area determined by the single point BET method at a nitrogen partial pressure of 0.05mm. Hg of at least 600 m.$^2$/gm., and preferably at least 700 m.$^2$/gm. (e.g. approximately 700 to 735 m.$^2$/gm.). The samples are first degassed by heating at 110° C. for 40 hours in a stream of purified nitrogen.

The activated carbon fibers of the present invention also are electrically conductive, and may exhibit an electrical conductivity as low as $4 \times 10^{-4}$ ohm/cm. in preferred embodiments. Such electrical conductivity facilitates the optional regeneration of fibers following absorption via a direct resistance heating route. Alternatively the fibers conveniently may be regenerated by heating in a nitrogen atmosphere at a temperature of approximately 100° to 200° C. for about 1 to 10 minutes.

The product of the present invention is particularly suited for forming lightweight protective garments and is capable of efficiently absorbing deleterious agents which may otherwise harm the wearer. For instance, sorbing characteristics of such product is about two times as active on a weight basis as the best activated carbon particles. The product also may be used in applications involving bacteria removal, blood purification, air cleaning, odor control, maintenance of a decontaminated space in a contaminated environment, etc.

The process of the present invention offers advantages when compared to prior processes for forming activated carbon fibers because of its relative ease and rapidity. Involved temperature staging and tension control during the thermal processing are not required. Also, the activation temperature tends to be significantly lower than that required with other fibrous precursors thereby making possible additional energy savings.

The following example is presented as a specific illustration of the invention. It should be understood, however, that the invention is not limited to the specific details set forth in the example.

EXAMPLE

A polybenzimidazole fabric of a thread count of 40/in. having a square weave construction and a weight of 9.5 oz./yd.$^2$ was selected for use in carrying out the process of the invention. The fabric had been woven from a polybenzimidazole spun yarn of 332 total denier, 2.5 grams per denier strength, 31.6 grams per denier initial modulus, and 21 percent elongation. This fabric had been woven from a continuous filament polybenzimidazole yarn of the 2,2'-(m-phenylene)-5,5'-bibenzimidazole chemical configuration which had been immersed in a two percent by weight aqueous solution of sulfuric acid at a temperature of 50° C. for a residence time of two minutes. During such contact the polybenzimidazonium sulfate salt was formed and the weight of the fibrous material increased by 30 percent. The continuous filament yarn had been washed to remove excess free acid adhering to the surface by rinsing with water, had been dried, and had been heat set by continuously passing for a residence time of six seconds in the direction of its length through a nitrogen atmosphere provided at 500° C.

A 6×6 inch swatch of the polybenzimidazole fabric was simply placed upon a wire screen and was placed in a Thermodyne 10500 muffle furnace which was provided with a flowing air atmosphere at a temperature of 450° C. No tension was exerted upon the fibrous material. The fibers were present in such preoxidation zone for a residence time of seven minutes. While present in such zone the fibers exhibited a weight loss of approximately 20 percent, and the swatch shrank to a size of approximately 5⅜×5⅜ inches. This represented a shrinkage in area of approximately 12 percent.

The resulting preoxidized fibrous material while present on the wire screen next was carbonized in the same oven by heating in a flowing nitrogen atmosphere for one minute which was provided at a temperature of 800° C. No effort was made to exert tension on the fibrous material during such processing. The resulting carbonaceous fibrous material contained approximately 63 percent carbon by weight.

Finally, the previously carbonized fibrous material was activated while present on the wire screen in the same oven by heating for ten minutes in a flowing atmosphere of water vapor and nitrogen which was provided at a temperature of 550° C. Prior to introduction into the oven the nitrogen gas was saturated with water vapor at room temperature (i.e. at approximately 25° C.) and was elevated to 550° C.

The resulting product was a flexible black fabric of 4.25 oz./yd.$^2$, contained approximately 63 percent carbon by weight, contained approximately 0.3 percent sulfur by weight, and retained approximately 30 percent of the weight exhibited immediately prior to preoxidation. When tested as heretofore described it exhibited a dynamic weight absorptivity of 140 mg. of $CCl_4$ per gram before the onset of breakthrough which was equivalent to 1.95 mg./cm.$^2$. The electrical conductivity of the product was found to be approximately $4 \times 10^{-4}$ ohm/cm. When examined by the single point BET method previously discussed the product exhibited a specific surface area in excess of 700 m.$^2$/gram. The product was particularly suited for use in the formation of lightweight protective clothing of high absorptivity.

Although the invention has been described with a preferred embodiment, it is to be understood that variations and modifications may be resorted to as will be apparent to those skilled in the art (e.g. the entire process could be carried out on a continuous basis, etc.). Such variations and modifications are to be considered within the purview and scope of the claims appended hereto.

I claim:

1. An improved process for forming activated carbon fibers comprising:
    (a) contacting polybenzimidazole fibrous material with a solution of an acid having a $pK_A$ value below about 4.5 to transform at least a portion of the polybenzimidazole to a polybenzimidazonium salt wherein the anion of said salt is derived from said acid,
    (b) preoxidizing said polybenzimidazole fibrous material containing said polybenzimidazonium salt by heating in an oxygen-containing gaseous atmosphere at a temperature of approximately 400° to 550° C.,
    (c) carbonizing said resulting preoxidized fibrous material by heating in a non-oxidizing gaseous atmosphere at a temperature of approximately 650° to 875° C. until a carbonaceous fibrous material is formed which contains at least 60 percent carbon by weight, and
    (d) heating said resulting carbonaceous fibrous material in an oxidizing gas at a temperature of approximately 450° to 600° C. until an activated carbonaceous fibrous material is formed having a dynamic weight absorptivity of at least 100 mg. of $CCl_4$ per gram.

2. An improved process for forming activated carbon fibers in accordance with claim 1 wherein said polybenzimidazole fibrous material consists essentially of recurring units of the formula:

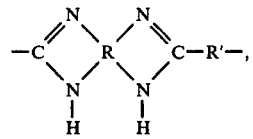

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from 4 to 8 carbon atoms, and (3) a heterocyclic ring selected from the group consisting of (a) pyridine, (b) pyrazine, (c) furan, (d) quinoline, (e) thiophene, and (f) pyran.

3. An improved process for forming activated carbon fibers in accordance with claim 1 wherein said polybenzimidazole fibrous material is poly-2,2'-(m-phenylene)-5,5'-bibenzimida- zole.

4. An improved process for forming activated carbon fibers in accordance with claim 1 wherein said polybenzimidazole fibrous material is in the form of a woven cloth.

5. An improved process for forming activated carbon fibers in accordance with claim 1 wherein said polybenzimidazole fibrous material prior to contact with said acid has a denier per filament of approximately 1 to 4.

6. An improved process for forming activated carbon fibers in accordance with claim 1 wherein said acid is sulfuric acid and polybenzimidazonium sulfate is formed in step (a).

7. An improved process for forming activated carbon fibers in accordance with claim 1 wherein said solution of said acid when utilized in step (a) is provided at a temperature of approximately 20° to 80° C.

8. An improved process for forming activated carbon fibers in accordance with claim 7 wherein the contact of said fibrous material with said acid in step (a) is accomplished by immersing said fibrous material in said acid solution for at least about 1 second.

9. An improved process for forming activated carbon fibers in accordance with claim 1 wherein said fibrous material is washed immediately following step (a) to substantially remove any adhering free acid.

10. An improved process for forming activated carbon fibers in accordance with claim 1 wherein said oxygen-containing gaseous atmosphere of step (b) is air.

11. An improved process for forming activated carbon fibers in accordance with claim 1 wherein said oxidizing gas of step (d) is selected from the group consisting of water vapor, carbon dioxide, nitrogen dioxide, and mixtures of the foregoing.

12. An improved process for forming activated carbon fibers comprising:
    (a) contacting a polybenzimidazole fibrous material with a solution of sulfuric acid provided at a temperature of approximately 20° to 80° C. to transform at least a portion of the polybenzimidazole to polybenzimidazonium sulfate, (b) preoxidizing said polybenzimidazole fibrous material containing said polybenzimidazonium sulfate by heating in air at a temperature of approximately 400° to 550° C. for approximately 1 to 60 minutes, (c) carbonizing said resulting preoxidized fibrous material by heating in a non-oxidizing gaseous atmosphere at a temperature of approximately 650° to 875° C. for approximately 0.5 to 5 minutes to form a carbonaceous fibrous material which contains at least 60 percent carbon by weight, and (d) heating said resulting carbonaceous fibrous material in a gaseous atmosphere containing water vapor at a temperature of approximately 450° to 600° C. for approximately 3 to 20 minutes to form an activated carbonaceous fibrous material having a dynamic weight absorptivity of at least 100 mg. of CCl$_4$ per gram.

13. An improved process for forming activated carbon fibers in accordance with claim 12 wherein said polybenzimidazole fibrous material consists essentially of recurring units of the formula:

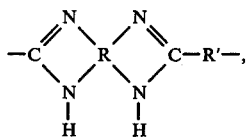

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from 4 to 8 carbon atoms, and (3) a heterocyclic ring selected from the group consisting of (a) pyridine, (b) pyrazine, (c) furan, (d) quinoline, (e) thiophene, and (f) pyran.

14. An improved process for forming activated carbon fibers in accordance with claim 12 wherein said polybenzimidazole fibrous material is poly-2,2'-(m-phenylene)-5,5'-bibenzimidazole.

15. An improved process for forming activated carbon fibers in accordance with claim 12 wherein said polybenzimidazole fibrous material is in the form of a woven cloth.

16. An improved process for forming activated carbon fibers in accordance with claim 12 wherein said polybenzimidazole fibrous material prior to contact with said acid has a denier per filament of approximately 1 to 4.

17. An improved process for forming activated carbon fibers in accordance with claim 12 wherein the contact of said fibrous material with said acid in step (a) is accomplished by immersing said fibrous material in said acid solution for at least about 30 seconds.

18. An improved process for forming activated carbon fibers in accordance with claim 12 wherein said fibrous material is washed immediately following step (a) to substantially remove any adhering free acid.

19. An improved process for forming activated carbon fibers comprising:

(a) contacting a polybenzimidazole fibrous material comprising poly-2,2'-(m-phenylene)-5,5'-bibenzimidazole having a denier per filament of approximately 1 to 4 with a solution of sulfuric acid provided at a temperature of approximately 20° to 80° C. to transform at least a portion of the polybenzimidazole to polybenzimidazonium sulfate, (b) preoxidizing said polybenzimidazole fibrous material containing said polybenzimidazonium sulfate by heating in air at a temperature of approximately 450° to 500° C. for approximately 5 to 10 minutes, (c) carbonizing said resulting preoxidized fibrous material by heating in a nitrogen atmosphere at a temperature of approximately 700° to 800° C. for approximately 0.7 to 2 minutes to form a carbonaceous fibrous material which contains at least 63 percent carbon by weight, and (d) heating said resulting carbonaceous fibrous material in a gaseous atmosphere containing water vapor at a temperature of approximately 500° to 550° C. for approximately 8 to 12 minutes to form an activated carbonaceous fibrous material having a dynamic weight absorptivity of at least 125 mg. of CCl$_4$ per gram.

20. An improved process for forming activated carbon fibers in accordance with claim 19 wherein said polybenzimidazole fibrous material is in the form of a woven cloth.

21. An improved process for forming activated carbon fibers in accordance with claim 19 wherein the contact of said fibrous material with said acid in step (a) is accomplished by immersing said fibrous material in said acid solution for at least about 1 second.

22. An improved process for forming activated carbon fibers in accordance with claim 19 wherein said fibrous material is washed immediately following step (a) to substantially remove any adhering free acid.

* * * * *